JOSEPH W. LYON
Improvement in Mechanism for Operating Attachments in Sewing Machines.
No. 122,268.  Patented Dec. 26, 1871.
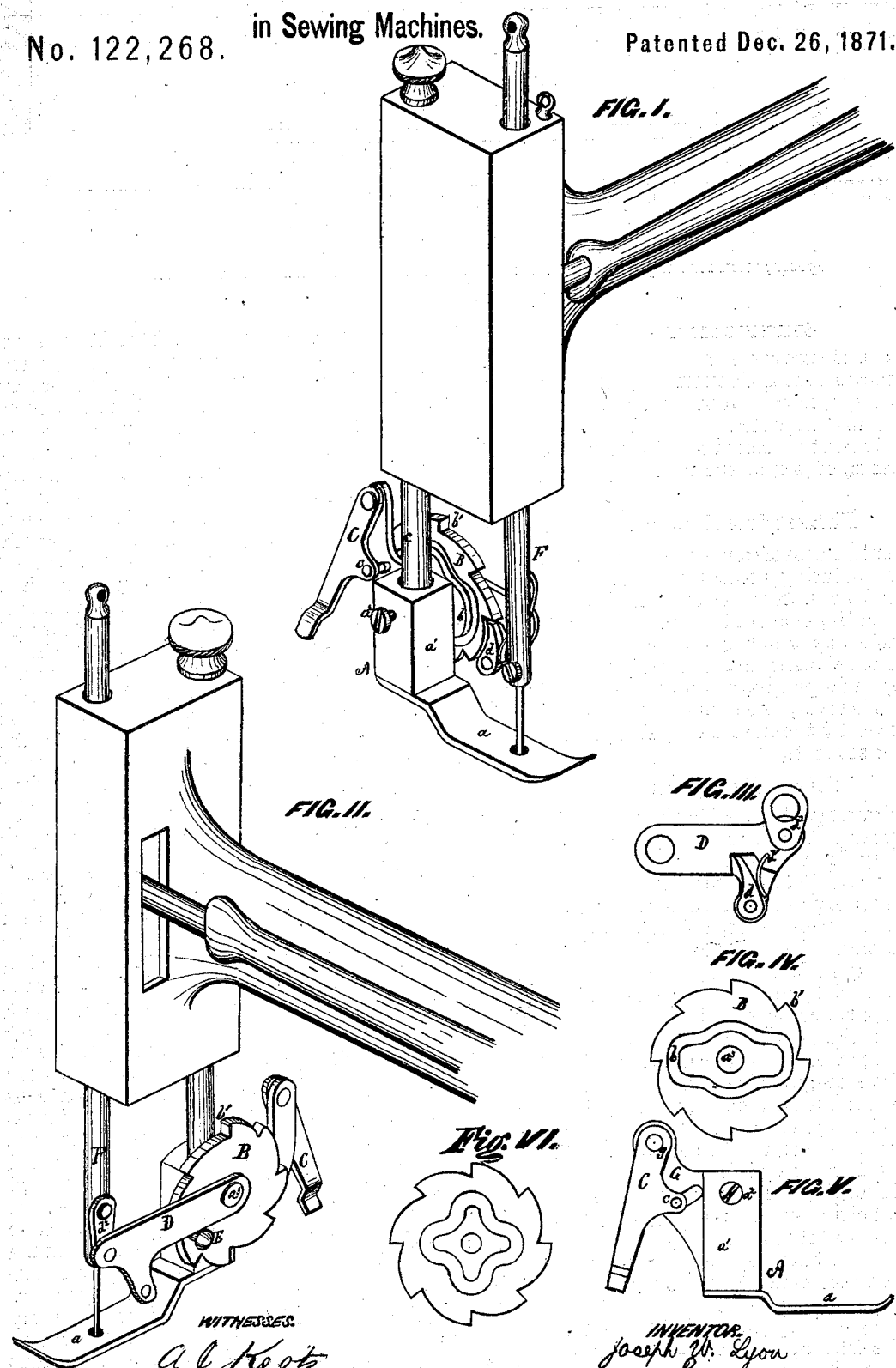

122,268

UNITED STATES PATENT OFFICE.

JOSEPH W. LYON, OF CHICAGO, ILLINOIS.

IMPROVEMENT IN MECHANISMS FOR OPERATING ATTACHMENTS IN SEWING-MACHINES.

Specification forming part of Letters Patent No. 122,268, dated December 26, 1871.

SPECIFICATION.

*To all whom it may concern:*

Be it known that I, JOSEPH W. LYON, of the city of Chicago, in the county of Cook and State of Illinois, have invented a certain new and useful Improvement in Actuating Sewing-Machine Attachments, of which the following is a specification:

Nature of the Invention.

My invention has reference to mechanical movements for operating attachments to sewing-machines; and consists in securing to the presser-foot a graduating-wheel having around its center a cam guide-way which operates the lever that moves the attachment, and is formed with notches or teeth upon its periphery, into which fits a pawl placed upon a lever, which lever is connected with and actuated by the needle-bar, all operating as hereinafter set forth.

General Description.

In the drawings, Figure I is a perspective view of my device applied to the presser-foot and needle-bar; Fig. II, a similar view from the right hand; Figs. III, IV, and V, respectively, detached elevations of the pawl-lever, cam-wheel, the transmitting or vibrating lever, and presser-foot.

A represents the presser-foot of a sewing-machine, $a$ being the foot itself and $a^1$ a socket piece which is secured upon the presser-foot bar by means of the set-screw $a^2$. To this socket piece is pivoted, at the point $a^3$, a cam-wheel or disk, B. The central portion of this disk is provided with a cam-groove or guide-way, $b$, into which fits a pin, $c$, that is in turn attached to a lever, C, which is pivoted at the point $g$ to an arm, G, projecting from the socket-piece $a^1$. The edge of the disk is provided with ratchet-teeth $b'$. A pawl, $d$, pivoted to a lever, D, which is hung at one end upon the pivot $a^3$ and connects at the other with the needle-bar F, fits into the notches $b'$, being pressed constantly against them by the action of the spring $d^1$. Connection is made between the lever D and the needle-bar by means of the link $d^2$. E is a screw or stop passing beneath the lever D and entering the disk B, and the link D strikes this pin as the needle descends and moves the disk and the vibrating-lever C. This screw E may also be inserted through the lever D.

The operation of the invention is as follows:

The socket-piece $a^1$, to which is attached the foot $a$ and the cam-wheel B, is secured upon the end of the presser-foot bar by turning up the set-screw $a^2$. The lever D is then connected with the needle-bar F, through the link $d^2$, by means of a screw passing through the eye in the link and entering the bar. When the machine is put in motion the movement of the needle-bar F is communicated, through the ratchet-lever D, to the cam-wheel or disk B by means of the pawl $d$, which, by catching in the notches $b'$, causes a circular movement of the disk upon the pivot $a^3$. If the stop E is not inserted through or beneath the lever D into the disk B, so as to restrain the action of the said lever, and the cam-guide $b$ be of the form shown in Fig. IV, the pin $c$ attached to the lever-arm C and working in said guide will cause this lever to make one complete movement forward and backward for every four complete motions of the needle-bar. This effect is secured by the form of the cam-guide $b$, which, being longer in one direction than in the other, admits of a partial rotation of the disk B—equal to four of the teeth $b'$, which correspond to four stitches—while the lever C, guided by the pin $c$, is attaining its full length of movement. By lessening the length of the cam-guide, as shown in Fig. VI, a complete movement of the lever C will be made while the needle-bar is taking eight stitches. The lever C may likewise be made to perform its movement once in two or in any number of stitches by adapting the size of the disk B and guide $b$ to the motion required in said lever. More than one vibrating-lever may be operated at one time by the cam-groove, adapting the movement to different purposes. By inserting the stop E in the disk B the pawl $d$ is prevented from passing from one notch to another on the disk; and after the said disk has been rotated in one direction by the pawl its motion is reversed by the downward movement of the lever D, which bears upon the stop. This stop is placed at such a point in the disk that the pin $c$ is carried from the nearest to the point furthest from the center of the disk, thereby producing a complete movement of the lever C for every complete movement of the needle-bar. The movement of lever C can be so regulated as to adapt it, in connection with suitable devices, for making plaits, braid, tucks, &c. By varying the form of the cam-guide and the size of the disk and number of the ratchet-teeth hereon almost any kind of forward and backward movement can be given to the lever C, which is intended to communicate motion to the working devices.

What I claim as my invention, and desire to secure by Letters Patent, is—

The stop E placed either beneath or penetrating through the lever D and secured in the disk B, as described, in combination with the lever C and base piece A and link D $d^2$, all constructed and operating as set forth.

In witness whereof I have hereunto signed my name in the presence of two subscribing witnesses.

JOSEPH W. LYON.

Witnesses:
C. C. PECK,
GEO. W. MIATT.

(134)